United States Patent

[11] 3,614,316

[72] Inventors Daniel E. Andrews, Jr.; William E. Klund; Robert D. Isaak, all of San Diego, Calif.

[21] Appl. No. 369,035
[22] Filed May 20, 1964
[45] Patented Oct. 19, 1971
[73] Assignee The United States of America as represented by the Secretary of the Navy
Continuation-in-part of application Ser. No. 352,687, Mar. 17, 1964.

[54] SECURE COMMUNICATION SYSTEM
4 Claims, 2 Drawing Figs.

[52] U.S. Cl. .......... 178/22, 325/34
[51] Int. Cl. .......... H04l 9/00, H04k 1/10
[50] Field of Search .......... 178/22, 67; 325/32, 122, 34, 40; 179/15 A

[56] References Cited
UNITED STATES PATENTS

| | | | |
|---|---|---|---|
| 2,444,452 | 7/1948 | Labin | 343/7.6 |
| 2,553,284 | 5/1951 | Sunstein | 331/78 |
| 2,796,602 | 6/1957 | Hess | 325/32 |
| 2,870,431 | 1/1959 | Babcock | 178/67 |
| 3,158,864 | 11/1964 | Lehan | 179/15 |

*Primary Examiner*—Rodney D. Bennett, Jr.
*Assistant Examiner*—Daniel C. Kaufman
*Attorneys*—Louis A. Miller, Paul N. Critchlow and Richard K. MacNeill

CLAIM: 1. An improved secure communication system comprising:

a first and a second pseudorandom noise generator, said generators having, respectively, a first and a second shift register, each register having N stages and having logical circuit means for randomly recirculating binary bits through the register for generating a random repeatable pattern of binary bits, a reset pulse source coupled to all stages of said first register to reset said first register to a predetermined starting binary number, a starting point switch matrix comprising N logical zero-one switches connected, respectively, between the stages of said second register and said reset pulse source, means for feeding a binary information number to said switches to reset said second register to a starting point a predetermined number different from the starting binary number of said first register, transmitting means for transmitting said pseudorandom noise generators outputs connected to the outputs of said pseudorandom noise generators;

receiving means for receiving said transmitting means transmissions, said receiving means having an output;

recycling storage means connected to the output of said receiving means for storing the receiving means output signals;

a third pseudorandom noise generator identical in sequence to said first and second pseudorandom noise generators having an output and a reset input, said receiving means output connected to said reset input;

a correlator having a first input connected to said storage means and a second input connected to said third pseudorandom noise generator output for generating a a signal upon correlation of said storage means output and said third pseudorandom noise generator output, and;

timing means connected to said correlator for timing the interval between outputs thereof.

INVENTORS
DANIEL E. ANDREWS, JR.
WILLIAM E. KLUND
BY ROBERT D. ISAAK

ATTORNEYS

SECURE COMMUNICATION SYSTEM

This application is a continuation-in-part of an application for Letters Patent entitled "Secure Communication System" filed Mar. 17, 1964, Ser. No. 352,687, by Daniel E. Andrews, Jr., William E. Klund, and Robert D. Isaak.

The invention described herein may be manufactured and used by or for the Government of the United States of America for governmental purposes without the payment of any royalties thereon or therefor.

The present invention relates to an improved secure communication system and more particularly, to an improved cryptographically secure communication system utilizing the transmission of echo ranging equipment having intelligence carried by a random noise characteristic.

In the parent application referred to above, a pseudorandom noise generator having a digital output of a random but repeated pattern is transmitted as a transmission of sonar echo ranging equipment. The pseudorandom noise generator for generating the random but repeatable pattern of "ones" and "zeros" comprises generally a shift register with N stages. A feedback circuit including a simple logic circuit is connected between the last stage and at least one intermediate stage to the first stage. The clock generator shifting the binary bits through the shift register may be of the order of 10 kc./sec. which produces, in a receiver, a sound indistinguishable from ordinary atmospheric noise. In a period of time which may be measured in seconds or minutes determined by $2^n$ and the clock frequency, the register completes a full cycle of binary numbers and returns to the starting state of "ones" and "-zeros" in the N stages. One well-known pseudorandom noise generator is disclosed in Westerfield U.S. Pat. No. 3,046,545 issued July 24, 1962. A pseudorandom noise generator at a receiving station identical to the one at the transmitter station is set at a predetermined point at the leading edge of the received signal, and outputs of the receiver and the receiving pseudorandom noise generator are correlated, the lapsed time from the leading edge of the received signal represents a predetermined message. This system has the disadvantage of having the timing depEndent upon the reset time or start time of the receiving pseudorandom noise generator which, in turn, is dependent upon a predetermined power level being received at the receiving station.

It has been found that the outputs of two pseudorandom noise generators at the transmitting station can be summed and transmitted without losing the intelligence of either one. Hence, if one pseudorandom noise generator is started with a given pattern at the beginning of each transmission and the second pseudorandom noise generator is started with a variable pattern depending upon the message number being sent, a double correlation will result at the correlator in the receiving station from a comparison of the receiving pseudorandom noise generator and the received signal i.e. there will be a correlation when the pseudorandom noise generator at the receiving station correlates with each of the patterns of the transmitted pseudorandom noise generator outputs. The time difference between the double correlation will then yield a message number which is not dependent upon the power level of the received signal's leading edge. This system has a further advantage of being more secure than the system of the parent application in that two coded pseudorandom noise generators are utilized in the transmission instead of one.

An object of the present invention is the provision of a secure communication system which utilizes pseudorandom noise patterns in transmissions.

Another object is the provision of a cryptographically secure communication system which can be utilized simultaneously with an echo ranging system without impairing the quality of either system.

A further object of the invention is the provision of a secure communication system utilizing digital techniques and thereby requiring a minimum of maintenance and adjustment.

Yet another object of the present invention is the provision of a secure communication system which is extremely reliable and does not depend for accuracy on the quality of the received signal.

Other objects and many of the attendant advantages of the invention will be readily appreciated as the same becomes better understood by reference to the following detailed description when considered in connection with the accompanying drawings in which like reference numerals designate like parts throughout the figures thereof and wherein.

Figure 1:
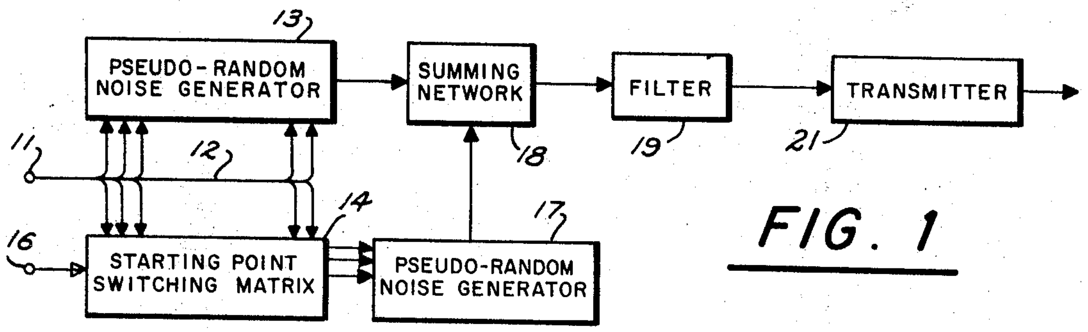
FIG. 1 is a block diagram of the transmitter of the present invention.

Referring to FIG. 1, terminal 11 is connected to reset bus 12 which, in turn, is connected to pseudorandom noise generator 13 and starting point switching matrix 14. Message number input 16 is also connected to starting point switching matrix 14. The outputs of starting point switching matrix 14 are connected to pseudorandom noise generator 17. The outputs of pseudorandom noise generators 13 and 17 are connected to summing network 18. The output of summing network 18 is connected through filter 19 to transmitter 21.

Figure 2:
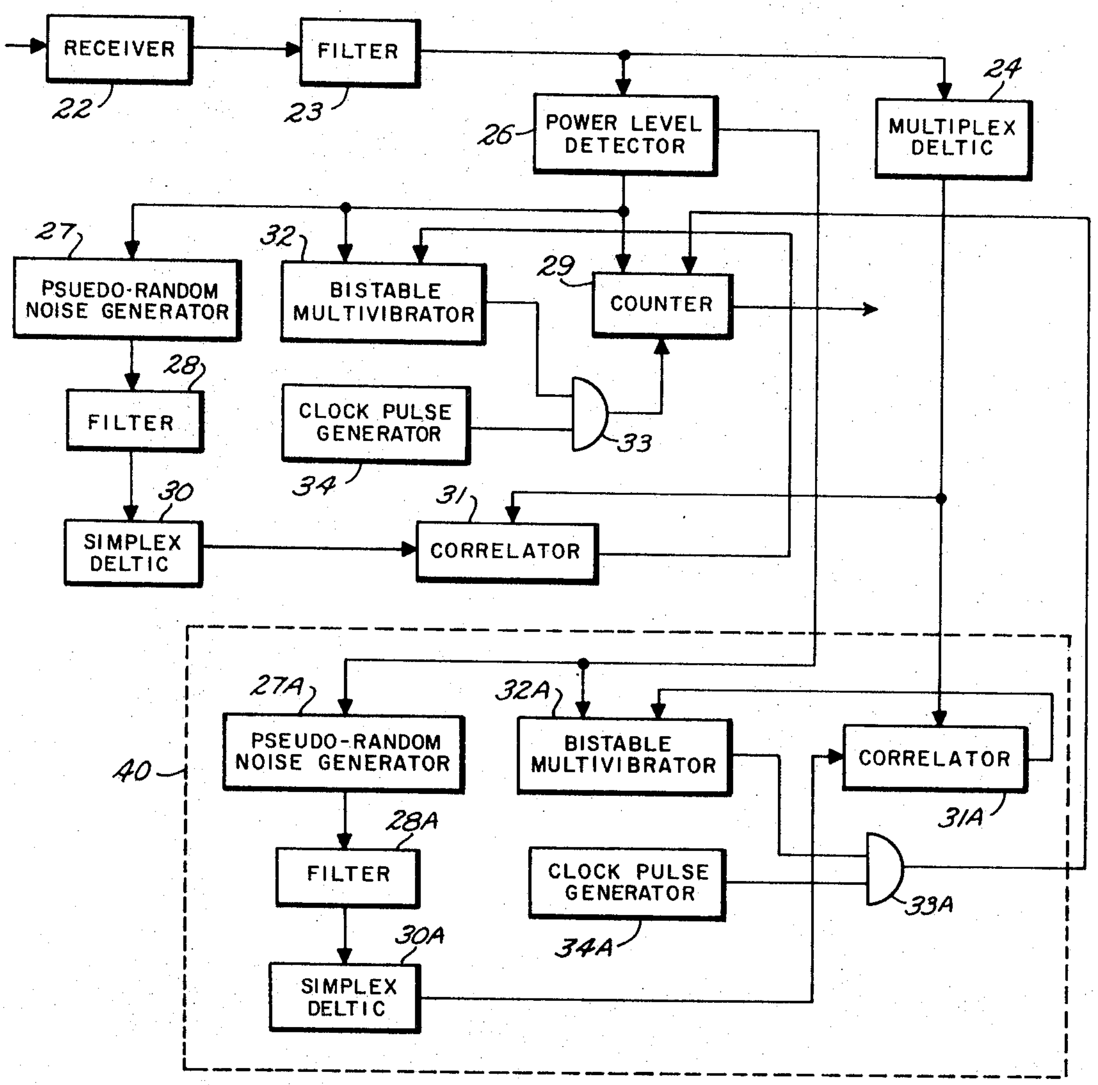
FIG. 2 is a block diagram of the receiving system of the present invention.

Referring to FIG. 2, receiver 22 has an output connected through filter 23 to multiplex deltic 24 and power level detector 26. The outputs of power level detector 26 are connected to high speed pseudorandom noise generator 27. bistable multivibrator 32 and counter 29.

The output of high speed pseudorandom noise generator 27 is connected through filter 28 to simplex deltic 30. The outputs of multiplex deltic 24 and simplex deltic 30 are connected to correlator 31. Correlator 31 has an output connected to bistable multivibrator 32. The output of bistable multivibrator 32 is connected to the enable-inhibit control circuit of AND-gate 33. Clock pulse generator 34 is also connected to AND-gate 33 the output of which is connected to counter 29.

The components contained within dotted lines 40 are duplicates of the receiving channel which will be explained below. Power-level detector 26 is also connected to high-speed pseudorandom noise generator **27*a*, and bistable multivibrator 32*a*. An output from multiplex deltic 24 is connected to correlator 31*a*. The output from high-speed pseudorandom noise generator 27*a* is connected through filter 28*a* to simplex deltic 30*a*, The output of which is connected to correlator 31*a*. The output of correlator 31*a* is connected to bistable multivibrator 32*a*, the output of which is connected to AND-gate 33*a*, AND-gate 33*a* has another input connected to clock pulse generator 34*a*. The output of gate 33*a* is also connected to counter 29**.

OPERATION

Referring back to FIG. 1 pseudorandom noise generator 13 is set at a predetermined starting point in its output sequence and the output coupled into summing network 18. At the same time starting point switching matrix steers a reset pulse 11 to effect a predetermined starting sequence of pseudorandom noise generator 17 determined by the input signal at terminal 16, which corresponds to a predetermined message number. The output of starting point switching matrix 14 then sets pseudorandom noise generator 17 at a predetermined starting point different from that of pseudorandom noise generator 13 but at a point at which pseudorandom noise generator 13 will eventually reach. The outputs of the two pseudorandom noise generators are then arithmetically added in summing network 18, filtered in filter 19, and transmitted from transmitter 21. It has been found that the arithmetic sum of two pseudorandom noise generators will result in a combined signal in which the output from each individual pseudorandom noise generator is present and furthermore can be correlated with either one of the two signals.

Referring to FIG. 2, receiving array 22 receives the transmission from transmitter 21, amplifies this information and filters it through filter 23. The outputs of filter 23 are then coupled into a multiplex deltic and a power level detector. Multiplex deltic 24 is a deltic in which one bit of information is coupled into it for each multiple rotation of the stored information, plus or minus one bit. Thus the signals are stored and time compressed in multiplex deltic 24. The operation of multiplex deltic 24 is explained in copending application Ser. No. 369,038, filed May 20, 1964 by William E. Klund and Robert D. Isaak, titled "Multiplex Deltic."

The time of reception, power level detector 26 yields an output of reset high-speed pseudorandom noise generator 27 at a predetermined point behind the reset position of pseudorandom noise generator 13 (FIG. 1). The pseudorandom noise generator 27 is identical to pseudorandom noise generators 13 and 17 except for the shifting rate, which matches that of multiplex deltic 24. At the same time, in conjunction with deltic 30, pseudorandom noise generator 27 is reset, a signal is also coupled from the detector 26 to reset bistable multivibrator 32 to a zero output and counter 29 to a zero count. The resetting of bistable multivibrator 32 results in an inhibit signal being applied to gate 33. Hence, bistable multivibrator 32 and gate 33 comprise a digital switch actuated by correlator 31 for connecting and disconnecting clock pulse generator 34 to counter 29.

The output of high-speed pseudorandom noise generator 27 is then filtered in filter 28 and coupled to the input of a simplex deltic 30. The outputs of multiplex deltic 24 and simplex deltic 30 are then coupled to correlator 31. When high-speed pseudorandom noise generator 27, and hence the output of simplex deltic 30, are correlated with the pseudorandom noise generator 13 pattern, a first output pulse results from correlator 31 which triggers bistable multivibrator 32 to a condition whereby an enabling pulse is presented to gate 33 allowing count pulses from clock pulse generator 34 to enter counter 29. At a later time when high-speed pseudorandom noise generator 27, and hence the output of simplex deltic 30, correlates again with the pattern of pseudorandom noise generator 17 (FIG. 1), a second pulse will result from correlator 31, triggering bistable multivibrator 32 to its other bistable condition and resulting in an inhibit pulse being coupled to gate 33 this will stop the count pulses from clock pulse generator 34 from entering counter 29 and the count is complete.

Additional channels as indicated by block 40 can be added to enable correlation to occur when there is considerable doppler present, resulting from relative motion between a transmitting and receiving station. It has been found from experience that one channel will correlate with a doppler shifted transmitted signal over a certain interval of doppler shift without serious loss of signal to noise ratio. Hence new channels must be added for increased doppler coverage when this interval is exceeded. This, if a maximum of ± 42 knots doppler effect is expected and each channel has a coverage of 12 knots total, seven channels in all must be provided i.e. the original channel will handle a plus or minus 6-knot doppler effect and three additional channels on each side would be required for a total coverage of ± 42 knots of doppler. The doppler channels will have different shift rates for their respective pseudorandom noise generators to compensate for the apparent change in shift rate from the transmitting station caused by doppler effect coverage of a single channel is a function of signal bandwidth and correlator integration time.

It should be understood, of course, that the foregoing disclosure relates to only a preferred embodiment of the invention and that it is intended to cover all changes and modifications of the examples of the invention herein chosen for the purpose of the disclosure which do not constitute departures from the spirit and scope of the invention.

We claim:

1. An improved secure communication system comprising:

a first and a second pseudorandom noise generator, said generators having, respectively, a first and a second shift register, each register having N stages and having logical circuit means for randomly recirculating binary bits through the register for generating a random repeatable pattern of binary bits, a reset pulse source coupled to all stages of said first register to rest said first register to a predetermined starting binary number, a starting point switch matrix comprising N logical zero-one switches connnected, respectively, between the stages of said second register and said reset pulse source, means for feeding a binary information number to said switches to reset said second register to a starting point a predetermined number different from the starting binary number of said first register.

transmitting means for transmitting said pseudorandom noise generators outputs connected to the outputs of said pseudorandom noise generators;

receiving means for receiving said transmitting means transmissions, said receiving means having an output;

recycling storage means connected to the output of said receiving means for storing the receiving means output signals;

a third pseudorandom noise generator identical in sequence to said first and second pseudorandom noise generators having an output and a reset input, said receiving means output connected to said reset input;

a correlator having a first input connected to said storage means and a second input connected to said third pseudorandom noise generator output for generating a signal upon correlation of said storage means output and said third pseudorandom noise generator output, and;

timing means connected to said correlator for timing the interval between outputs thereof.

2. The improved secure communication system of claim 1 wherein said storage means comprises a deltic.

3. The improved secure commmunication system of claim 1 further including a second deltic connected between the output of said third pseudorandom noise generator and said correlator.

4. The improved secure communication system of claim 1 wherein said timing means comprises:

a bistable multivibrator connected to the output of said correlator for generating, respectively, an enabling and an inhibiting voltage in response to successive correlator output signals;

a clock pulse generator;

a counter, and;

a gate coupling the output of said clock pulse generator to said counter and having a control circuit coupled to the output of said multivibrator for counting the number of clock pulses during the application of an enabling voltage to said gate.